(12) United States Patent
Chen

(10) Patent No.: US 7,619,371 B2
(45) Date of Patent: Nov. 17, 2009

(54) INVERTER FOR DRIVING BACKLIGHT DEVICES IN A LARGE LCD PANEL

(75) Inventor: Wei Chen, Campbell, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 74 days.

(21) Appl. No.: 11/401,512

(22) Filed: Apr. 11, 2006

(65) Prior Publication Data

US 2007/0236153 A1   Oct. 11, 2007

(51) Int. Cl.
*H05B 37/02* (2006.01)
(52) U.S. Cl. .................. 315/291; 315/307; 315/224; 315/209 R; 315/276
(58) Field of Classification Search ............. 315/209 R, 315/212, 219, 224–226, 246, 276, 283, 291, 315/307–308, 312; 345/102
See application file for complete search history.

(56) References Cited

U.S. PATENT DOCUMENTS

| | | | |
|---|---|---|---|
| 5,528,192 A | 6/1996 | Agiman et al. |
| 5,615,093 A | 3/1997 | Nalbant |
| 5,619,402 A | 4/1997 | Liu |
| 5,757,173 A | 5/1998 | Agiman |
| 5,892,336 A | 4/1999 | Lin et al. |
| 5,923,129 A | 7/1999 | Henry |
| 5,930,121 A | 7/1999 | Henry |
| 6,104,146 A | 8/2000 | Chou et al. |
| 6,198,234 B1 | 3/2001 | Henry |
| 6,198,245 B1 | 3/2001 | Du et al. |
| 6,259,615 B1 | 7/2001 | Lin |
| 6,307,765 B1 | 10/2001 | Choi |
| 6,396,722 B2 | 5/2002 | Lin |
| 6,459,602 B1 | 10/2002 | Lipcsei |
| 6,469,922 B2 | 10/2002 | Choi |
| 6,501,234 B2 | 12/2002 | Lin et al. |
| 6,507,173 B1 | 1/2003 | Spiridon et al. |
| 6,515,881 B2 | 2/2003 | Chou et al. |
| 6,531,831 B2 | 3/2003 | Chou et al. |
| 6,559,606 B1 | 5/2003 | Chou et al. |
| 6,570,344 B2 | 5/2003 | Lin |
| 6,654,268 B2 | 11/2003 | Choi |
| 6,657,274 B2 | 12/2003 | Comeau et al. |
| 6,756,769 B2 | 6/2004 | Bucur et al. |
| 6,781,325 B2 | 8/2004 | Lee et al. |
| 6,809,938 B2 | 10/2004 | Lin et al. |
| 6,853,047 B1 | 2/2005 | Comeau et al. |
| 6,856,519 B2 | 2/2005 | Lin et al. |
| 6,864,669 B1 | 3/2005 | Bucur |
| 6,870,330 B2 | 3/2005 | Choi |
| 6,873,322 B2 | 3/2005 | Hartular |
| 6,876,157 B2 | 4/2005 | Henry |
| 6,888,338 B1 | 5/2005 | Popescu-Stanesti et al. |
| 6,897,698 B1 | 5/2005 | Gheorghiu et al. |
| 6,900,993 B2 | 5/2005 | Lin et al. |
| 6,906,497 B2 | 6/2005 | Bucur et al. |

(Continued)

*Primary Examiner*—Douglas W Owens
*Assistant Examiner*—Ephrem Alemu
(74) *Attorney, Agent, or Firm*—Perkins Coie LLP

(57) ABSTRACT

Two out-of-phase inverters are used for driving a backlight for large LCD panels. The lamp currents of each inverter are regulated to substantially the same level to ensure the same brightness in the lamps without any current balancing devices. The switching frequencies in both inverters are synchronized and maintained in an out-of-phase condition during operation.

18 Claims, 2 Drawing Sheets

U.S. PATENT DOCUMENTS

| | | |
|---|---|---|
| 6,936,975 B2 * | 8/2005 | Lin et al. .................... 315/224 |
| 6,946,806 B1 | 9/2005 | Choi |
| 6,979,959 B2 | 12/2005 | Henry |
| 6,999,328 B2 | 2/2006 | Lin |
| 7,023,709 B2 | 4/2006 | Lipcsei et al. |
| 7,057,611 B2 | 6/2006 | Lin et al. |
| 7,061,183 B1 | 6/2006 | Ball |
| 7,075,245 B2 | 7/2006 | Liu |
| 7,095,392 B2 | 8/2006 | Lin |
| 7,112,929 B2 | 9/2006 | Chiou |
| 7,112,943 B2 | 9/2006 | Bucur et al. |
| 7,120,035 B2 | 10/2006 | Lin et al. |
| 7,126,289 B2 | 10/2006 | Lin et al. |
| 7,141,933 B2 | 11/2006 | Ball |
| 7,157,886 B2 | 1/2007 | Agarwal et al. |
| 7,161,309 B2 | 1/2007 | Chiou et al. |
| 7,173,382 B2 | 2/2007 | Ball |
| 7,183,724 B2 | 2/2007 | Ball |
| 7,183,727 B2 | 2/2007 | Ferguson et al. |
| 7,187,139 B2 | 3/2007 | Jin |
| 7,187,140 B2 | 3/2007 | Ball |
| 7,190,123 B2 | 3/2007 | Lee et al. |
| 7,200,017 B2 | 4/2007 | Lin |
| 7,205,726 B2 * | 4/2007 | Maeda et al. ................ 315/291 |
| 7,227,315 B2 * | 6/2007 | Shinbo et al. ................ 315/224 |
| 2002/0180380 A1 | 12/2002 | Lin |
| 2005/0030776 A1 | 2/2005 | Lin |
| 2005/0093471 A1 | 5/2005 | Jin |
| 2005/0093482 A1 | 5/2005 | Ball |
| 2005/0093484 A1 | 5/2005 | Ball |
| 2005/0151716 A1 | 7/2005 | Lin |
| 2005/0174818 A1 | 8/2005 | Lin et al. |
| 2005/0225261 A1 | 10/2005 | Jin |
| 2006/0202635 A1 | 9/2006 | Liu |
| 2006/0232222 A1 | 10/2006 | Liu et al. |
| 2006/0279521 A1 | 12/2006 | Lin |
| 2007/0001627 A1 | 1/2007 | Lin et al. |
| 2007/0046217 A1 | 3/2007 | Liu |
| 2007/0047276 A1 | 3/2007 | Lin et al. |
| 2007/0085493 A1 | 4/2007 | Kuo et al. |

\* cited by examiner

_US 7,619,371 B2_

INVERTER FOR DRIVING BACKLIGHT DEVICES IN A LARGE LCD PANEL

TECHNICAL FIELD

The present invention relates generally to the field of discharge lighting, and in particular, relates to efficiently supplying electrical power for driving discharge lamps, such as cold cathode fluorescent lamps (CCFL), external electrode fluorescent lamps (EEFL), and flat fluorescent lamps (FFL).

BACKGROUND INFORMATION

In general, long CCFLs, EEFLs, or FFLs are required in large liquid crystal display (LCD) applications. These lamps demand high driving voltages. One method to drive long discharge lamps is to use a single inverter. However, it is very difficult to achieve uniform lamp brightness in this method. First, it is difficult to balance lamp currents on each end of the lamps. Sometimes, current balance transformers are added on each lamp end to balance the current of each lamp and achieve uniform brightness. However, this adds additional cost and complexity to the system. Also, if all discharge lamps are driven in a single-ended configuration, the voltage rating of the transformer's secondary winding would need to be too high to be realistically manufactured at a reasonable cost.

In order to achieve optimized performance and cost in large LCD panels, it is desirable to drive the discharge lamps with an improved system or method.

BRIEF DESCRIPTION OF DRAWINGS

The following figures illustrate embodiments of the invention. These figures and embodiments provide examples of the invention and they are non-limiting and non-exhaustive.

DETAILED DESCRIPTION

Embodiments of a system and method that uses two inverters and accompanying circuitry to achieve uniform brightness in large panel applications are described in detail herein. In the following description, some specific details, such as example circuits and example values for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with systems, circuits, and methods that are meant to be exemplary and illustrative. In various embodiments, the above problem has been reduced or eliminated, while other embodiments are directed to other improvements.

The present invention relates to circuits and methods of driving discharge lamps in large panel applications and achieving uniform brightness.

The system with the present invention has two out-of-phase inverters. The lamp currents of each inverter are regulated to substantially the same level to ensure the uniform brightness in different lamps. It eliminates the need of additional current balancing devices. Each inverter can detect its own fault conditions and communicate the fault condition with the other inverter to ensure proper protection. The switching frequencies in both inverters are synchronized and maintained in an out-of-phase condition during operation. Neither inverter can be turned on before the switching frequencies of the two inverters are substantially synchronized. This prevents any abnormal output waveforms on the lamps.

Figure 1:
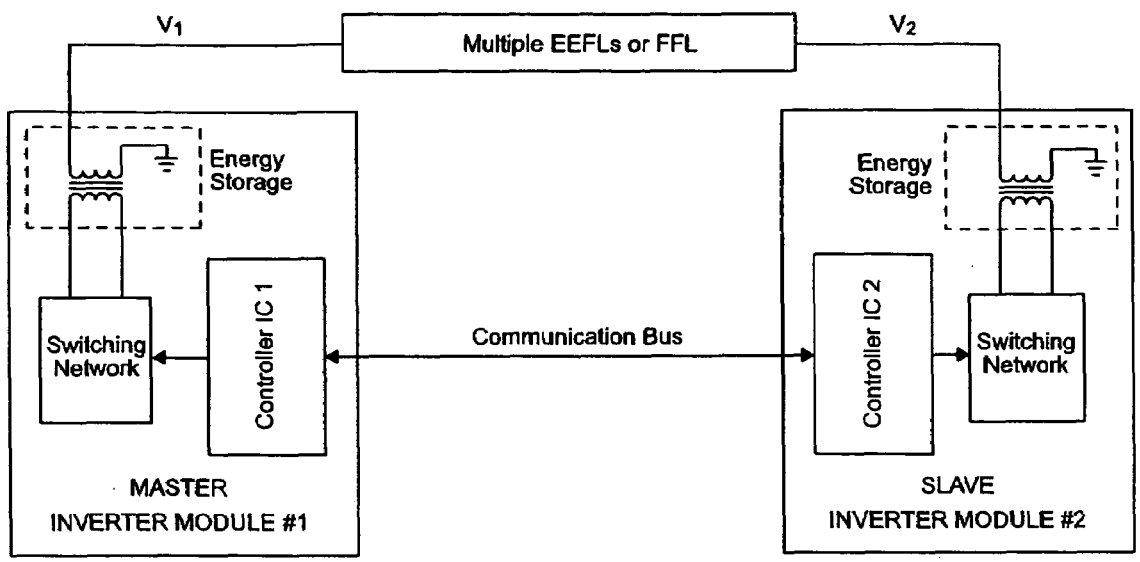
FIG. 1 illustrates an embodiment of the present invention.

FIG. 1 is a schematic of a system of the present invention. There are two inverters in the system. One is a master inverter and the other one is a slave inverter. Both master and slave inverters generate high frequency and high voltage AC signals at their own outputs to drive one end of the lamps, respectively. The phases of the AC signals are substantially 180 degree out of phase at the opposite end of the lamps. The RMS output currents of the master and slave inverters are regulated to substantially the same level.

As shown in FIG. 1, there is a communication bus between the master and slave inverters. The two inverters communicate with each other through the communication bus so that they can reach substantially the same output current, out-of-phase operation, and proper protection if a fault condition occurs in either inverter. In FIG. 1, each inverter module comprises a controller, a switching network, and energy storage elements. Typically, the switching networks and energy storage elements in two inverter modules are substantially identical; while the controllers in two inverter modules could be either the same or different.

Figure 2:
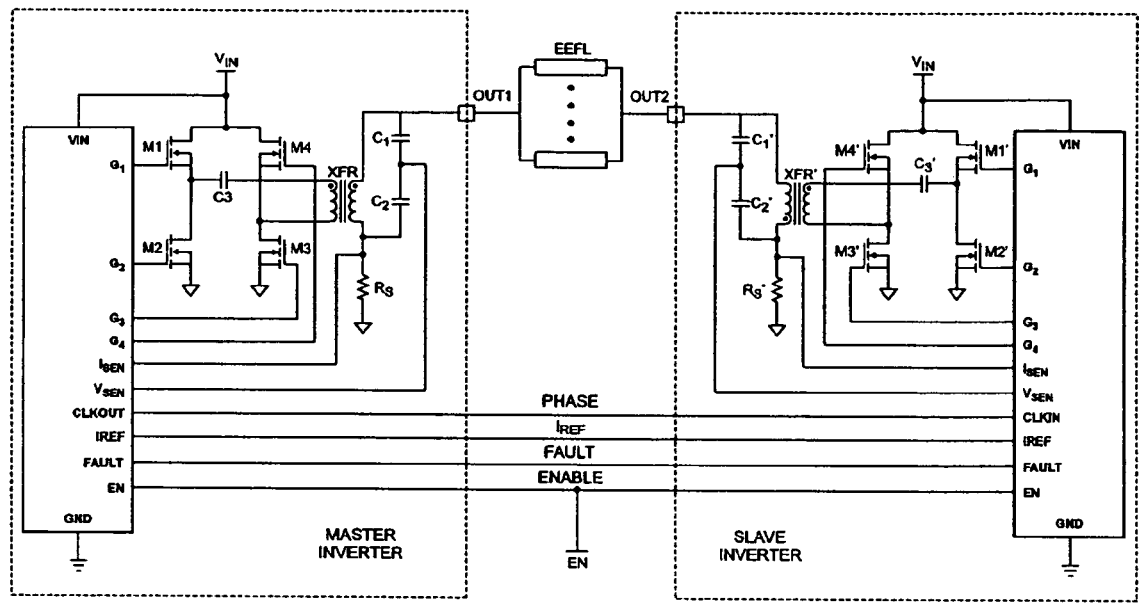
FIG. 2 shows an example of the present invention implemented in a large LCD panel application.

FIG. 2 shows an embodiment of the present invention in a simplified large panel application. The circuit includes a master inverter and a slave inverter with both inverters in a full-bridge configuration. However, it can be appreciated that the inverters may use different type of known architectures or ones developed in the future. Each inverter comprises 4 MOSFET switches (M1, M2, M3 and M4 in the master inverter, M1', M2', M3', and M4' in the slave inverter) in a full bridge configuration, a transformer (XFR in the master inverter, XFR' in the slave inverter), and the resonant capacitors (C1, C2 and C3 in the master inverter, C1', C2' and C3' in the slave inverter).

Each inverter senses its output voltage and current separately. The output voltage is sensed by the capacitor divider (C1 and C2 in the master inverter, C1' and C2' in the slave inverter) and the current is sensed by the resistor (Rs in the master inverter, Rs' in the slave inverter) in series with the common return of the secondary winding and capacitor divider. By regulating the output current of each inverter to substantially the same reference level ($I_{REF}$), the uniform lamp brightness can be achieved. The master and slave inverters can both detect fault conditions and communicate with each other through the FAULT line when a fault condition occurs. For example, when a fault condition is detected either the master or slave could use the FAULT line to inform the other so that the appropriate steps can be taken.

The switching frequency in the slave inverter is synchronized to the input at its CLKIN pin, which receives a signal from the CLKOUT pin of the master controller, and is maintained in an out-of-phase condition with that in the master inverter. If a fault condition is detected or both switching frequencies are not synchronized, neither inverter can be turned on or produce switching waveforms at its output stage. The master inverter also generates an $I_{REF}$ signal representing the lamp current reference signal and sends it to the slave inverter. The $I_{REF}$ signal can be either a PWM signal or a DC voltage signal. The PWM signal is a fixed frequency square waveform with its duty cycle representing the lamp current reference signal. If two inverters are spaced far apart, there is less noise by using the PWM signal. However, the PWM signal requires more complicated circuitry than the DC voltage signal. The slave inverter receives the $I_{REF}$ signal from the master inverter and regulates its lamp current $I_{REF}$ to significantly the same level as that in the master inverter. Although the embodiment of the present invention illustrated in FIG. 2 uses a full-bridge configuration, it can be easily extended to other circuit topologies such as half bridge, push-pull and other resonant inverter topologies.

In the present invention, a system that has two inverters, a master inverter and a slave inverter, is introduced to achieve uniform brightness in large panel applications. The switching frequencies of two inverters are substantially synchronized with 180 degree phase shift. The lamp currents of each inverter are regulated to substantially the same level to achieve uniform lamp brightness.

The description of the invention and its applications as set forth herein is illustrative and is not intended to limit the scope of the invention. Variations and modifications of the embodiments disclosed herein are possible, and practical alternatives to and equivalents of the various elements of the embodiments are known to those of ordinary skill in the art. Other variations and modifications of the embodiments disclosed herein may be made without departing from the scope and spirit of the invention.

I claim:

1. A method for driving single or multiple discharge lamps, comprising:
    driving one end of said discharge lamps with a master inverter and the other end of said discharge lamps with a slave inverter;
    sending a current reference signal from said master inverter to said slave inverter; wherein said current reference signal is related to the lamp current in said master inverter; and
    receiving said current reference signal and regulating the lamp current in said slave inverter to substantially the same as that in said master inverter;
    wherein the switching frequency of said slave inverter is synchronized to and maintained in an out-of-phase relationship with the switching frequency of said master inverter.

2. The method in claim 1, wherein said current reference signal is either a pulse width modulation (PWM) signal or a DC voltage signal.

3. The method in claim 1, wherein both said master and slave inverters are shut down if a fault condition occurs in either said master inverter or said slave inverter.

4. The method in claim 1, wherein said master and slave inverters are in full-bridge configuration.

5. The method in claim 1, wherein said master and slave inverters are in half bridge configuration.

6. The method in claim 1, wherein said master and slave inverters are in push-pull configuration.

7. The method in claim 1, further comprising:
    sending a phase signal from said master inverter to said slave inverter wherein said phase signal represents the switching frequency and phase information of said master inverter; and
    receiving said phase signal and regulating said slave inverter such that the voltage output of said slave inverter is substantially 180 degree out of phase with respect to the voltage output of said master inverter.

8. The method in claim 7, wherein both said master and slave inverters are turned on only if the switching frequencies in both said master and slave inverters are substantially synchronized and 180 degree out-of-phase.

9. A system for driving a single or multiple discharge lamps, comprising:
    a master inverter that drives one end of said discharge lamps; and
    a slave inverter that drives the other end of said discharge lamps;
    wherein the switching frequency of said slave inverter is synchronized to and maintained in an out-of-phase relationship, with the switching frequency of said master inverter, said master inverter sends a current reference signal to said slave inverter and said slave inverter receives said current reference signal and regulates its lamp, current to be substantially the same as that in said master inverter;
    wherein said current reference signal is related to the lamp current in said master inverter.

10. The system in claim 9, wherein said current reference signal is either a pulse width modulation (PWM) signal or a DC voltage signal.

11. The system in claim 9, wherein both said master and slave inverters are shut down if a fault condition occurs in either said master inverter or said slave inverter.

12. The system in claim 9, wherein said master and slave inverters are in full-bridge configuration.

13. The system in claim 9, wherein said master and slave inverters are in half bridge configuration.

14. The system in claim 9, wherein said master and slave inverters are in push-pull configuration.

15. The system in claim 9 wherein said master inverter further includes:
    a transformer having a primary winding and a secondary winding;
    a switching network electrically coupled to said primary winding of said transformer; and
    a first controller electrically coupled to said switching network.

16. The system in claim 9 wherein said slave inverter further comprise:
    a transformer having a primary winding and a secondary winding, said secondary winding electrically coupled to the other end of said discharge lamps;
    a switching network electrically coupled to said primary winding of said transformer; and
    a second controller electrically coupled to said switching network.

17. The system in claim 9, wherein said master inverter sends a phase signal to said slave inverter and said slave inverter receives said phase signal and regulates its voltage output substantially 180 degree out of phase with respect to the voltage output of said master inverter; wherein said phase signal represents the switching frequency and phase information of said master inverter.

18. The system in claim 17, wherein both said master and slave inverters are turned on only if the switching frequencies in both said master and slave inverters are substantially synchronized and 180 degree out-of-phase.

* * * * *

UNITED STATES PATENT AND TRADEMARK OFFICE
CERTIFICATE OF CORRECTION

PATENT NO.      : 7,619,371 B2                                    Page 1 of 1
APPLICATION NO. : 11/401512
DATED           : November 17, 2009
INVENTOR(S)     : Wei Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 294 days.

Signed and Sealed this

Twenty-sixth Day of October, 2010

David J. Kappos
*Director of the United States Patent and Trademark Office*